United States Patent

Yu et al.

[11] Patent Number: 6,063,863
[45] Date of Patent: May 16, 2000

[54] AQUEOUS COMPOSITIONS CONTAINING COLLOIDAL SILICA AND COMPOUNDS WITH ALKOXYSILANE AND/OR SILANOL GROUPS

[75] Inventors: Poli C. Yu, Ingomar; William A. Corso, Coraopolis; Richard R. Roesler, Wexford; Joseph R. Kleer, Crescent, all of Pa.

[73] Assignee: Bayer Corporation, Pittsburgh, Pa.

[21] Appl. No.: 09/221,033

[22] Filed: Dec. 23, 1998

[51] Int. Cl.⁷ ..................................................... C08L 83/08
[52] U.S. Cl. ........................ 524/838; 524/839; 106/287.11
[58] Field of Search ........................... 524/838, 839; 106/287.11

[56] References Cited

U.S. PATENT DOCUMENTS 5,859,118  1/1999  Roesler et al. ........................ 524/493

*Primary Examiner*—Margaret G. Moore
*Attorney, Agent, or Firm*—Joseph C. Gil; Thomas W. Roy

[57] ABSTRACT

The present invention relates to aqueous solutions or dispersions of compositions containing A) compounds, which contain 0.5 to 15% by weight of alkoxysilane and/or silanol groups (calculated as Si, MW 28), based on the weight of the compounds containing alkoxysilane groups, and are substantially free from isocyanate groups and chemically incorporated hydrophilic groups, wherein the alkoxysilane groups are initially incorporated by the reaction of a polyisocyanate with an amino compound corresponding to formula I

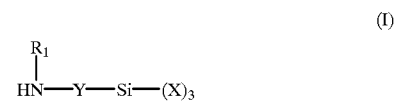

wherein
X represents identical or different organic groups which are inert to isocyanate groups below 100° C., provided that at least one of these groups is an alkoxy group,
Y represents a linear or branched alkylene group having 1 to 8 carbon atoms and
$R_1$ represents an organic group which is inert to isocyanate groups at a temperature of 100° C. or less, and B) 1 to 20% by weight, preferably 1 to 15% by weight and most preferably to 2 to 10% by weight of colloidal silica, based on weight of the compounds containing alkoxysilane groups.

The present invention also relates to coating, adhesive or sealing compositions containing these aqueous compounds as the binder.

19 Claims, No Drawings

AQUEOUS COMPOSITIONS CONTAINING COLLOIDAL SILICA AND COMPOUNDS WITH ALKOXYSILANE AND/OR SILANOL GROUPS

BACKGROUND OF THE INVENTION

1. Field of the Invention

The present invention relates to aqueous dispersions or solutions of compositions containing compounds, which contain alkoxysilane and/or silanol groups, and colloidal silica to increase the pot life, and to their use as binders for coating, adhesive or sealant compositions.

2. Description of the Prior Art

Compounds containing urea or hydantoin groups and also containing alkoxysilane groups are known and disclosed in U.S. Pat. Nos. 5,756,751 and 5,364,955. The presence of alkoxysilane groups in these compounds can be used to improve the adhesion and chemical resistance properties of coatings when compared to those prepared from the known polyurethane resins. One of the disadvantages of these compounds is the need to blend them with organic solvents in order to reduce their viscosity for certain applications.

Applications, U.S. Ser. No. 08/992,163, now U.S. Pat. No. 5,932,652, Ser. No. 08/992,551, now U.S. Pat. No. 5,919,860, and Ser. No. 09/057,675, now U.S. Pat. No. 5,952,445, disclose that it is possible to reduce or eliminate the need for organic solvents by dispersing the compounds containing alkoxysilane groups in water. However, in order to render these compounds water dispersible it is necessary to hydrophilically modify these aqueous compositions by chemically incorporating ionic and/or non-ionic hydrophilic groups and optionally by the use of external emulsifiers.

While the presence of the hydrophilic groups improves the compatibility of the urea/hydantoin compounds with water, it also makes the coatings, adhesives or sealants prepared from these compounds more sensitive to water or moisture. In particular, the water resistance of the resulting products is reduced and the amount of water swelling that the products undergo in the presence of water is increased.

These deficiencies were overcome in copending application Ser. No. 09/221,032, which describes aqueous compounds containing alkoxysilane and/or silanol groups that did not require the known ionic and/or non-ionic hydrophilic groups to render the compounds water soluble or dispersible. One of the disadvantages of these aqueous compositions is that their pot life is too short for certain applications.

Accordingly, it is an object of the present invention to increase the pot life of the aqueous compounds disclosed in the copending application.

This object may be achieved in accordance with the present invention by mixing the aqueous compounds of the copending application with colloidal silica as described hereinafter.

SUMMARY OF THE INVENTION

The present invention relates to aqueous solutions or dispersions of compositions containing A) compounds, which contain 0.5 to 15% by weight of alkoxysilane and/or silanol groups (calculated as Si, MW 28), based on the weight of the compounds containing alkoxysilane groups, and are substantially free from isocyanate groups and chemically incorporated hydrophilic groups, wherein the alkoxysilane groups are initially incorporated by the reaction of a polyisocyanate with an amino compound corresponding to formula I

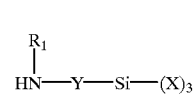

wherein
X represents identical or different organic groups which are inert to isocyanate groups below 100° C., provided that at least one of these groups is an alkoxy group,
Y represents a linear or branched alkylene group having 1 to 8 carbon atoms and
$R_1$ represents an organic group which is inert to isocyanate groups at a temperature of 100° C. or less, and B) 1 to 20% by weight colloidal silica, based on weight of the compounds containing alkoxysilane groups.

The present invention also relates to coating, adhesive or sealing compositions containing these aqueous compounds as the binder.

DETAILED DESCRIPTION OF THE INVENTION

Compounds A) are based on the reaction products of polyisocyanates with amino-functional alkoxysilanes. After they are mixed with water at least a portion of the alkoxysilane groups are hydrolyzed to silanol groups. The compounds containing alkoxysilane groups are present in an amount sufficient to incorporate a minimum amount of 0.5%, preferably 1.0% and more preferably 1.5% by weight, and a maximum amount of 15%, preferably 12% and more preferably 9% by weight, of alkoxysilane groups (calculated as Si, MW 28), wherein the percentages are based on the weight of compounds containing alkoxysilane groups. When based on the weight of the compounds containing silanol groups, these percentages will be higher because of the weight loss of the alkyl groups.

Compounds A) are substantially free from isocyanate groups, i.e., they contain less than 0.1% by weight of isocyanate groups, based on the weight of the compounds. Compounds A) are also substantially free from chemically incorporated hydrophilic groups, such as non-ionic, anionic and/or cationic groups, i.e., they have an ionic group content of less than 2 milliequivalents per 100 g of compounds containing alkoxysilane groups and they have a hydrophilic ethylene oxide content of less than 1%, based on the weight of the compounds containing alkoxysilane groups.

Suitable compounds containing alkoxysilane groups and amino groups, which may be used to prepare compounds A), include those corresponding to formula I wherein
X represents identical or different organic groups which are inert to isocyanate groups below 100° C., provided that at least one of these groups is an alkoxy group, preferably alkyl or alkoxy groups having 1 to 4 carbon atoms and more preferably alkoxy groups,
Y represents a linear or branched alkylene group containing 1 to 8 carbon atoms, preferably a linear group containing 2 to 4 carbon atoms or a branched group containing 5 to 6 carbon atoms, more preferably a linear group containing 3 carbon atoms and
$R^1$ represents an organic group which is inert to isocyanate groups at a temperature of 100° C. or less, preferably an alkyl, cycloalkyl or aromatic group having 1 to 12, more preferably 1 to 8 carbon atoms, or a group corresponding to formula II

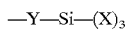

Especially preferred are compounds in which X represents methoxy, ethoxy groups or propoxy groups, more preferably methoxy or ethoxy groups and most preferably methoxy groups, and n is 3.

Examples of suitable aminoalkyl alkoxysilanes of formula I containing secondary amino groups include N-phenylaminopropyl-trimethoxysilane (available as Y-9669 from OSI Specialties, Witco), bis-(y-trimethoxysilylpropyl)amine (available as A-1170 from OSI Specialties, Witco), N-cyclohexylaminopropyltriethoxysilane, N-methylaminopropyl-trimethoxysilane and the corresponding alkyl diethoxy and alkyl dimethoxy silanes.

A special group of compounds containing alkoxysilane groups are those which also contain aspartate groups, such as those corresponding to formula III

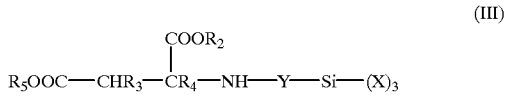

wherein X and Y are previously defined, $R_2$ and $R_5$ are identical or different and represent organic groups which are inert to isocyanate groups at a temperature of 100° C. cr less, preferably alkyl groups having 1 to 9 carbon atoms, more preferably methyl, ethyl or butyl groups and $R_3$ and $R_4$ are identical or different and represent hydrogen or organic groups which are inert towards isocyanate groups at a temperature of 100° C. or less, preferably hydrogen.

The compounds of formula III are prepared by reacting aminoalkyl alkoxysilanes corresponding to formula IV

with maleic or fumaric acid esters corresponding to the formula

Examples of suitable aminoalkyl alkoxysilanes corresponding to formula IV include 2-aminoethyl-dimethylmethoxysilane; 6-aminohexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane and 3-aminopropyl-triisopropoxysilane. 3-aminopropyl-trimethoxysilane and 3-aminopropyl-triethoxysilane are particularly preferred.

Examples of optionally substituted maleic or fumaric acid esters suitable for use in the preparation of the polyaspartates include dimethyl, diethyl, dibutyl (e.g., di-n-butyl), diamyl, di-2-ethylhexyl esters and mixed esters based on mixture of these and/or other alkyl groups of maleic acid and fumaric acid; and the corresponding maleic and fumaric acid esters substituted by methyl in the 2- and/or 3-position. The dimethyl, diethyl and dibutyl esters of maleic acid are preferred, while the diethyl and dibutyl esters are especially preferred.

The reaction of primary amines with maleic or fumaric acid esters to form the aspartates of formula III is known and described, e.g. in U.S. Pat. No. 5,364,955, which is herein incorporated by reference. The preparation of the aspartates may be carried out, for example, at 3 temperature of 0 to 100° C. using the starting materials in such proportions that at least 1, preferably 1, olefinic double bond is present for each primary amino group. Excess starting materials may be removed by distillation after the reaction.

The reaction may be carried out with or without a solvent, but the use of a solvent is less preferred. If a solvent is used, dioxane is in example of a suitable solvent. The compounds of formula III are colorless to pale yellow. They may be reacted with polyisocyanate component to form the compounds containing isocyanate and alkoxysilane groups without further purification.

Suitable polyisocyanates for preparing the compounds containing alkoxysilane groups are selected from monomeric diisocyanates, polyisocyanate adducts and NCO prepolymers. The polyisocyanates have an average isocyanate functionality of 1.5 to 6, preferably 1.8 to 6, more preferably 2 to 6 and most preferably 2 to 4.

Suitable monomeric polyisocyanate include organic diisocyanates represented by the formula, $R(NCO)_2$, in which R represents an organic group obtained by removing the isocyanate groups from an organic diisocyanate having a molecular weight of from about 112 to 1,000, preferably from about 140 to 400. Preferred diisocyanates are those in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Polyisocyanates containing 3 or more isocyanate groups such as 4-isocyanatomethyl-1,8-octamethylene diisocyanate and aromatic polyisocyanates such as 4,4',4"-triphenylmethane triisocyanate arid polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethyl-cyclohexane (isophorone diisocyanate or IPDI), bis-(4-isocyanato-cyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate.

In accordance with the present invention the polyisocyanate component may also be in the form of a polyisocyanate adduct. Suitable polyisocyanate adducts are those containing isocyanurate, uretdione, biuret, urethane, allophanate, carbodiimide and/or oxadiazinetrione groups. The polyisocyanates adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanatoisocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g., a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, uretdione, biuret groups, iminooxadiazine dione and/or allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to 6,000, preferably 800 to 3,000, and optionally low molecular weight compounds having molecular weights below 400. The molecular weights are number average molecular weights (Mn) and are determined by end group analysis (OH and/or NH number).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Examples of suitable polyester polyols include those prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-$\epsilon$-caprolactone, are also suitable for producing the prepolymers.

Also suitable for preparing the prepolymers are polyether polyols, which may be obtained in known manner by the alkoxylation of suitable starter molecules. Examples of suitable starter molecules include polyols, water, organic polyamines having at least two N—H bonds and mixtures thereof. Preferred alkylene oxides for the alkoxylation reaction are ethylene oxide, propylene oxide and/or tetrahydrofuran, which may be used in sequence or in admixture. Tetrahydrofuran is especially preferred.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

Other examples include the known high molecular weight amine-functional compounds, which may be prepared by converting the terminal hydroxy groups of the polyols previously described to amino groups, and the high molecular weight polyaspartates and polyaldimines disclosed in U.S. Pat. Nos. 5,243,012 and 5,466,771, respectively, herein incorporated by reference.

The NCO prepolymers are produced by reacting the polyisocyanate component with the polyol component at a temperature of 40 to 120° C., preferably 50 to 100° C., at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

The compounds containing alkoxysilane groups are prepared by reacting the polyisocyanate component with the amino-functional silanes in an amount such that substantially all of the isocyanate groups are reacted. The reaction is preferably carried out by incrementally adding the isocyanate-reactive compound to the polyisocyanate, although it is also possible to add the polyisocyanate to the isocyanate-reactive compound.

If an excess of the amino-functional silanes is used, they remain in admixture with the aqueous compounds according to the invention and take part in the subsequent hydrolysis and crosslinking reactions.

The reaction between the polyisocyanate component and the amino group-containing compounds is generally conducted at temperatures of 5 to 90° C., preferably 20 to 80° C., and more preferably 30 to 60° C. The reaction conditions are normally maintained until the isocyanate groups are essentially completely reacted.

In accordance with the present invention the special type of urea groups formed by the reaction of the compounds containing alkoxysilane groups and aspartate groups of formula III with the polyisocyanate component may be converted to hydantoin groups in known manner by heating the compounds at elevated temperatures, optionally in the presence of a catalyst. Therefore, the term "urea groups" is also intended to include other compounds containing the group, N—CO—N, such as hydantoin groups.

To prepare the aqueous compositions according to the present invention the compounds containing alkoxysilane groups are blended with water, optionally in the presence of an organic solvent and optionally under acidic pH conditions. When the compounds containing alkoxysilane groups are prepared from low viscosity polyisocyanates, e.g., those having a viscosity of less than 15,000, preferably less than 10,000 mPa.s at 25° C., such as low viscosity monomeric diisocyanates, it is generally not necessary to add a solvent in order to be able to disperse the polyisocyanate in water. However, when higher viscosity monomers, adducts and NCO prepolymers are used, the use of a solvent is preferred.

Suitable solvents are those that are known from polyurethane chemistry, especially water miscible solvents such as monoalcohols.

After the compounds have been mixed with water, it is necessary to hydrolyze at least a portion of the alkoxysilane groups to silanol groups so that the compounds remain dispersed or dissolved in water. It is because of this hydrolysis step that it is possible disperse or dissolve the compounds according to the invention in the absence of chemically incorporated hydrophilic groups.

To hydrolyze the alkoxysilane groups, it is generally necessary to maintain an acidic pH of less than 6, preferably less than 5 and more preferably less than 4. The acidic pH may be obtained by the addition of any acid, e.g., an organic acid or an inorganic acid, such as a mineral acid. Organic acids are preferred. Suitable acids include acetic, paratoluene sulfonic acid, hydrochloric acid, dodecylbenzene sulfonic acid (Nacure 5076, available from King industries), dinonylnaphthalene monpsulfonic acid (DNNSA, Nacure 1051, available from King Industries) and dinonylnaphthalene disulfonic acid (Nacure 155, available from King Industries).

To ensure that hydrolysis takes place in sufficient time to form a stable dispersion or solution of the compounds according to the invention, it is preferred to either mix the acid with these compounds prior to the addition of water or to mix the acid with water prior to the addition of the compounds, more preferably the latter.

After hydrolysis of at least a portion of the alkoxysilane groups to silanol groups, the compounds form a stable, but temporary dispersion or solution in water. The products only have a potlife of a few minutes to several hours because after hydrolysis the newly formed silanol groups undergo silane condensation to form crosslinked products that no longer remain dissolved or dispersed in water. It is possible to increase the pot life of the hydrolyzed products by increasing the pH to a value of at least 5, preferably at least 6.

In accordance with the present invention it is possible to further increase the potlife of the aqueous compositions by the addition of colloidal silica. Suitable examples of colloidal silica include those having various particle sizes and surface treatments. The colloidal silica preferably has an average particle size of 1 to 500 nanometers, more preferably 1 to 100 nanometers. The surface treatments include acid washing or alkali washing with bases such as sodium or ammonium hydroxide. Examples of colloidal silica are those available from DuPont under the Ludox tradename.

The aqueous compositions according to the invention contain 1 to 20% by weight, preferably 1 to 15% by weight, more preferably to 2 to 10% by weight of colloidal silica, based on weight of the compounds containing alkoxysilane groups.

The colloidal silica may be added to the aqueous compositions either before, during or after the formation of the dispersion or solution of the compounds containing alkoxysilane and/or silanol groups. Preferably, the colloidal silica is mixed with water before the addition of the compounds containing alkoxysilane groups.

After the hydrolysis reaction the resulting product is a clear dispersion or solution that may be used to prepare coatings, adhesives or sealants. The composition has a solids content of up to 60% by weight, preferably 15 to 60% by weight and more preferably 30 to 50% by weight. However, it is always possible to dilute the dispersions to any minimum solids content desired. The average particle size of the produces is less than 1.0 micron, preferably 0.001 to 0.5 microns and more preferably 0.01 to 0.3 microns. The small particle size enhances the stability of the dispersed particles and also leads to the production of films with high surface gloss and a high distinctness of image.

The compounds of the present invention are suitable for use in coating, adhesive or sealing compositions, which are cured in the presence of water or moisture.

The curing reaction is catalyzed in the presence of acidic or basic catalysts, preferably the same acids that were used to catalyze the hydrolysis reaction. Examples of other suitable catalysts include metallic salts such as dibutyl tin dilaurate; tertiary amines such as triethylamine or triethylene diamine; and mixtures of these catalysts. Low molecular weight, basic aminoalkyl trialkoxysilanes, such as those represented by formula IV, also accelerate hardening of the compounds according to the invention.

The compositions may also contain known additives, such as leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating, roll coating. The compositions may be clear or pigmented lacquers.

The compositions may be cured at ambient temperature or at elevated temperatures. Preferably, the moisture-curable resins are cured at ambient temperatures.

The invention is further illustrated, but is not intended to be limited by the following examples, in which all parts and percentages are by weight unless otherwise specified.

EXAMPLES

Preparation of silane aspartate 8.27 equiv. of 3-aminopropyltrimethoxysilane were added to a 5 liter flask fitted with agitator, thermocouple, nitrogen inlet and addition funnel with condenser. 8.27 equiv. of diethyl maleate were added dropwise through the addition funnel over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete. The resulting N-(3-trimethoxysilylpropyl) aspartic acid diethyl ester had a viscosity at 25° C. of 11 mPa.s.

Example 1

597.6 parts (1.7 equiv.) of N-(3-trimethoxysilylpropyl) aspartic acid diethyl ester and 142.8 parts (1.7 equiv.) of 1,6-hexamethylene diisocyanate were added to a three neck, 5 liter, round bottom flask equipped with an agitator, nitrogen inlet, thermocouple and condenser. The reaction to form the urea was accompanied by an exotherm which increased the temperature of the reaction mixture to 80° C. The reaction was held at 80° C. for 14 hours at which time the IR spectrum showed no residual isocyanate in the urea. The product was cooled and 500 parts of the urea were combined with 5 parts of glacial acetic acid in a 1 liter flask fitted with an agitator, nitrogen inlet, thermocouple and condenser with vacuum outlet. The reaction temperature was increased to 106° C. where the reaction mixture began to reflux as ethanol was released from the cyclization reaction. When the IR spectrum showed no residual urea, the reactor was cooled to 75° C. and a vacuum was applied at 1 torr. 38.8 parts of ethanol (theoretical 40.8 parts) were isolated. The resulting product had a viscosity of 7200 mPa.s at 25° C.

Examples 2–4

In Examples 2–4 the HDI silane hydantoin from Example 1 was mixed in a container with dodecylbenzene sulfonic acid (DDBSA, Nacure 5076, available from King Industries) and a flow additive (Byk 345, available from Byk Chemie). The resulting mixture was blended with water or a mixture of water and colloidal silica (Ludox AS-30, available from DuPont). The gel time of the final product was then determined and recorded. The amounts of the various components and the gel times are set forth in Table 1.

| Composition | Example 2 (Comp.) | Example 3 | Example 4 |
|---|---|---|---|
| Silane from Example 1 | 49.7 | 48.0 | 47.3 |
| DDBSA | 0.5 | 0.5 | 0.5 |
| Flow Additive | 0.1 | 0.1 | 0.1 |
| Distilled water | 49.7 | 48.0 | 47.3 |
| Colloidal silica | 0 | 3.4 | 4.8 |
| Total parts | 100 | 100 | 100 |
| Gel time | 15 min | 4 hr | 24 hr |

It can be seen from the preceding gel times that the presence of colloidal silica improves the pot life of the aqueous compositions according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous solution or dispersion of a composition comprising

A) a compound, which contains 0.5 to 15% by weight of alkoxysilane and/or silanol groups (calculated as Si, MW 28), based on the weight of the compound containing alkoxysilane groups, and is substantially free from isocyanate groups and chemically incorporated hydrophilic groups, wherein the alkoxysilane groups are initially incorporated by the reaction of a polyisocyanate comprising a monomeric polyisocyanate having aliphatically and/or cycloaliphatically bound isocyanate groups or a polyisocyanate adduct containing isocyanurate, uretdione, biuret, iminooxadiazine dione and/or allophanate groups with an amino compound corresponding to formula I

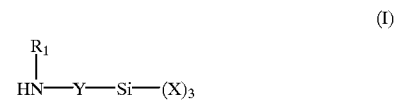

wherein

X represents identical or different organic groups which are inert to isocyanate groups below 100° C., provided that at least one of these groups is an alkoxy group, Y represents a linear or branched alkylene group having 1 to 8 carbon atoms and R$_1$ represents an organic group which is inert to isocyanate groups at a temperature of 100° C. or less, and B) 1 to 20% by weight of colloidal silica, based on weight of the compound containing alkoxysilane groups.

2. The aqueous composition of claim 1 wherein said amino compound corresponds to formula III

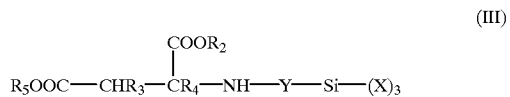

wherein

R$_2$ and R$_5$ are identical or different and represent organic groups which are inert to isocyanate groups at a temperature of 100° C. or less and R$_3$ and R$_4$ are identical or different and represent hydrogen or organic groups which are inert towards isocyanate groups at a temperature of 100° C. or less.

3. The aqueous composition of claim 2 wherein

X represents identical or different alkyl or alkoxy groups having 1 to 4 carbon atoms, Y represents a linear radical containing 2 to 4 carbon atoms or a branched radical containing 5 to 6 carbon atoms, R$_1$ and R$_2$ are identical or different and represent alkyl groups having 1 to 9 carbon atoms and R$_3$ and R$_4$ represent hydrogen.

4. The aqueous composition of claim 2 wherein

X represents identical or different alkoxy groups having 1 to 4 carbon atoms,

Y represents a linear radical containing 2 to 4 carbon atoms or a branched radical containing 5 to 6 carbon atoms, R₁ and R₂ are identical or different and represent methyl, ethyl or butyl and R₃ and R₄ represent hydrogen.

5. The aqueous composition of claim 1 wherein said polyisocyanate comprises a monomeric polyisocyanate having aliphatically and/or cycloaliphatically bound isocyanate groups.

6. The aqueous composition of claim 2 wherein said polyisocyanate comprises a monomeric polyisocyanate having aliphatically and/or cycloaliphatically bound isocyanate groups.

7. The aqueous composition of claim 3 wherein said polyisocyanate comprises a monomeric polyisocyanate having aliphatically and/or cycloaliphatically bound isocyanate groups.

8. The aqueous composition of claim 4 wherein said polyisocyanate comprises a monomeric polyisocyanate having aliphatically and/or cycloaliphatically bound isocyanate groups.

9. The aqueous composition of claim 1 wherein said polyisocyanate comprises a polyisocyanate adduct containing isocyanurate groups, uretdione, biuret groups, iminooxadiazine dione and/or allophanate groups.

10. The aqueous composition of claim 2 wherein said polyisocyanate comprises a polyisocyanate adduct containing isocyanurate groups, uretdione, biuret groups, iminooxadiazine dione and/or allophanate groups.

11. The aqueous composition of claim 3 wherein said polyisocyanate comprises a polyisocyanate adduct containing isocyanurate groups, uretdione, biuret groups, iminooxadiazine dione and/or allophanate groups.

12. The aqueous composition of claim 4 wherein said polyisocyanate comprises a polyisocyanate adduct containing isocyanurate groups, uretdione, biuret groups, iminooxadiazine dione and/or allophanate groups.

13. The aqueous composition of claim 1 wherein compound A) contains 1 to 15% by weight of alkoxysilane and/or silanol groups (calculated as Si, MW 28), based on the weight of the compound containing alkoxysilane groups, and colloidal silica B) is present in an amount of 2 to 10% by weight, based on weight of the compound containing alkoxysilane groups.

14. The aqueous composition of claim 2 wherein compound A) contains 1 to 15% by weight of alkoxysilane and/or silanol groups (calculated as Si, MW 28), based on the weight of the compound containing alkoxysilane groups, and colloidal silica B) is present in an amount of 2 to 10% by weight, based on weight of the compound containing alkoxysilane groups.

15. The aqueous composition of claim 5 wherein compound A) contains 1 to 15% by weight of alkoxysilane and/or silanol groups (calculated as Si, MW 28), based on the weight of the compound containing alkoxysilane groups, and colloidal silica B) is present in an amount of 2 to 10% by weight, based on weight of the compound containing alkoxysilane groups.

16. The aqueous composition of claim 6 wherein compound A) contains 1 to 15% by weight of alkoxysilane and/or silanol groups (calculated as Si, MW 28), based on the weight of the compound containing alkoxysilane groups, and colloidal silica B) is present in an amount of 2 to 10% by weight, based on weight of the compound containing alkoxysilane groups.

17. The aqueous composition of claim 9 wherein compound A) contains 1 to 15% by weight of alkoxysilane and/or silanol groups (calculated as Si, MW 28), based on the weight of the compound containing alkoxysilane groups, and colloidal silica B) is present in an amount of 2 to 10% by weight, based on weight of the compound containing alkoxysilane groups.

18. The aqueous composition of claim 10 wherein compound A) contains 1 to 15% by weight of alkoxysilane and/or silanol groups (calculated as Si, MW 28), based on the weight of the compound containing alkoxysilane groups, and colloidal silica B) is present in an amount of 2 to 10% by weight, based on weight of the compound containing alkoxysilane groups.

19. A coating, adhesive or sealing composition containing the aqueous composition of claim 1 as the binder.

* * * * *